(12) United States Patent
Smith

(10) Patent No.: US 8,096,521 B1
(45) Date of Patent: Jan. 17, 2012

(54) SYSTEM AND METHOD FOR OUTBOARD MOTOR STABILIZATION

(76) Inventor: James Dale Smith, Weatherford, TX (US)

( * ) Notice: Subject to any disclaimer, the term of this patent is extended or adjusted under 35 U.S.C. 154(b) by 649 days.

(21) Appl. No.: 12/205,631

(22) Filed: Sep. 5, 2008

Related U.S. Application Data

(63) Continuation-in-part of application No. 11/654,089, filed on Jan. 17, 2007, now abandoned.

(51) Int. Cl.
- F16M 13/00 (2006.01)
- B63H 5/20 (2006.01)
- B63H 35/73 (2006.01)

(52) U.S. Cl. ........ 248/640; 248/644; 248/645; 440/53; 440/55; 114/55.51

(58) Field of Classification Search .................. 248/640, 248/642, 644, 645, 351, 354.3, 354.4; 440/50, 440/51, 53, 55, 57, 599; 114/55.5, 55.52, 114/55.54, 55.55; 280/779, 829
See application file for complete search history.

(56) References Cited

U.S. PATENT DOCUMENTS

| | | | |
|---|---|---|---|
| 4,154,417 A * | 5/1979 | Foley, Jr. ...................... | 248/640 |
| 4,331,431 A | 5/1982 | Estes | |
| 4,391,592 A | 7/1983 | Hundertmark | |
| 4,501,561 A | 2/1985 | Speelman | |
| 4,828,186 A | 5/1989 | Weiss | |
| 4,842,239 A | 6/1989 | Kinsey et al. | |
| 5,031,842 A | 7/1991 | Mohr | |
| 5,149,285 A | 9/1992 | Kinoshita | |
| 5,178,568 A | 1/1993 | Binversie et al. | |
| 5,337,908 A * | 8/1994 | Beck, Jr. ...................... | 212/312 |
| 5,393,251 A | 2/1995 | Gilbert | |
| 5,505,641 A | 4/1996 | Onoue | |
| 5,658,177 A | 8/1997 | Wagner | |
| 5,775,669 A | 7/1998 | Huggins et al. | |
| 6,076,796 A * | 6/2000 | Huggins et al. ............... | 248/640 |
| 6,227,920 B1 | 5/2001 | Alby et al. | |
| 6,309,265 B1 | 10/2001 | Oguma | |
| 6,325,686 B1 | 12/2001 | Funami | |
| 7,097,157 B1 * | 8/2006 | Lodrick ......................... | 254/362 |
| 7,244,152 B1 | 7/2007 | Uppgard | |
| 7,837,413 B1 * | 11/2010 | Kundel, Sr. ................... | 405/283 |

\* cited by examiner

*Primary Examiner* — Tan Le

(74) *Attorney, Agent, or Firm* — James E. Walton; Noah A. Tevis

(57) ABSTRACT

An outboard motor and steering system motion stabilizer is disclosed that positively locks the outboard motor and steering system in the proper position for trailering. The disclosed stabilizer device effectively isolates the road-to-trailer-to-motor shock transfer that is delivered to the lower unit of the outboard motor by traditional transom savers that brace the outboard motor to the trailer. The disclosed stabilizer device is adjustable to fit many different outboard motor brands and sizes with hydraulic tilt and trim systems.

20 Claims, 6 Drawing Sheets

SYSTEM AND METHOD FOR OUTBOARD MOTOR STABILIZATION

This is a continuation-in-part application of application Ser. No. 11/654,089, filed 17 Jan. 2007, which is hereby incorporated by reference.

BACKGROUND

1. Field of the Invention

The present application relates to systems and methods for stabilizing outboard motors. In particular, the present application relates to systems and methods for stabilizing outboard motors during trailering of the boat and motor.

2. Description of Related Art

Boats and other such marine vehicles are known that include an outboard motor attached to the transom of the boat via a hydraulic tilt and trim system. Typically, when the boat is either being placed into the water, taken out of the water, in transit, or in storage, the motor is tilted forwardly. Conventionally, support devices referred to as "transom savers" are used to support the outboard motor in this position. Typical transom savers are attached to the trailer and to the outboard motor to prevent wear and damage to the boat transom while traveling on highways or during storage. Examples of conventional transom savers are disclosed in U.S. Pat. No. 4,331,431 to Estes, U.S. Pat. No. 4,828,186 to Weiss, and U.S. Pat. No. 4,842,239 to Kinsey et al. However, modern outboard motors are typically loaded onto the main hydraulic "tilt and trim" piston, and the transoms in modern boats are built to handle the weight and the torque from powerful 300 horsepower engines and rough water. Thus, prior support devices that required drilling and/or attachment hardware for attaching the transom saver support device to the trailer are unnecessary and inconvenient. However, it remains desirable to stabilize the outboard motor in order to prevent the outboard motor from excessively rocking and twisting during transit.

Hence, there is a need for a convenient stabilizing device that is designed for use with a wide range of modern steering systems and outboard motors of marine vehicles.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
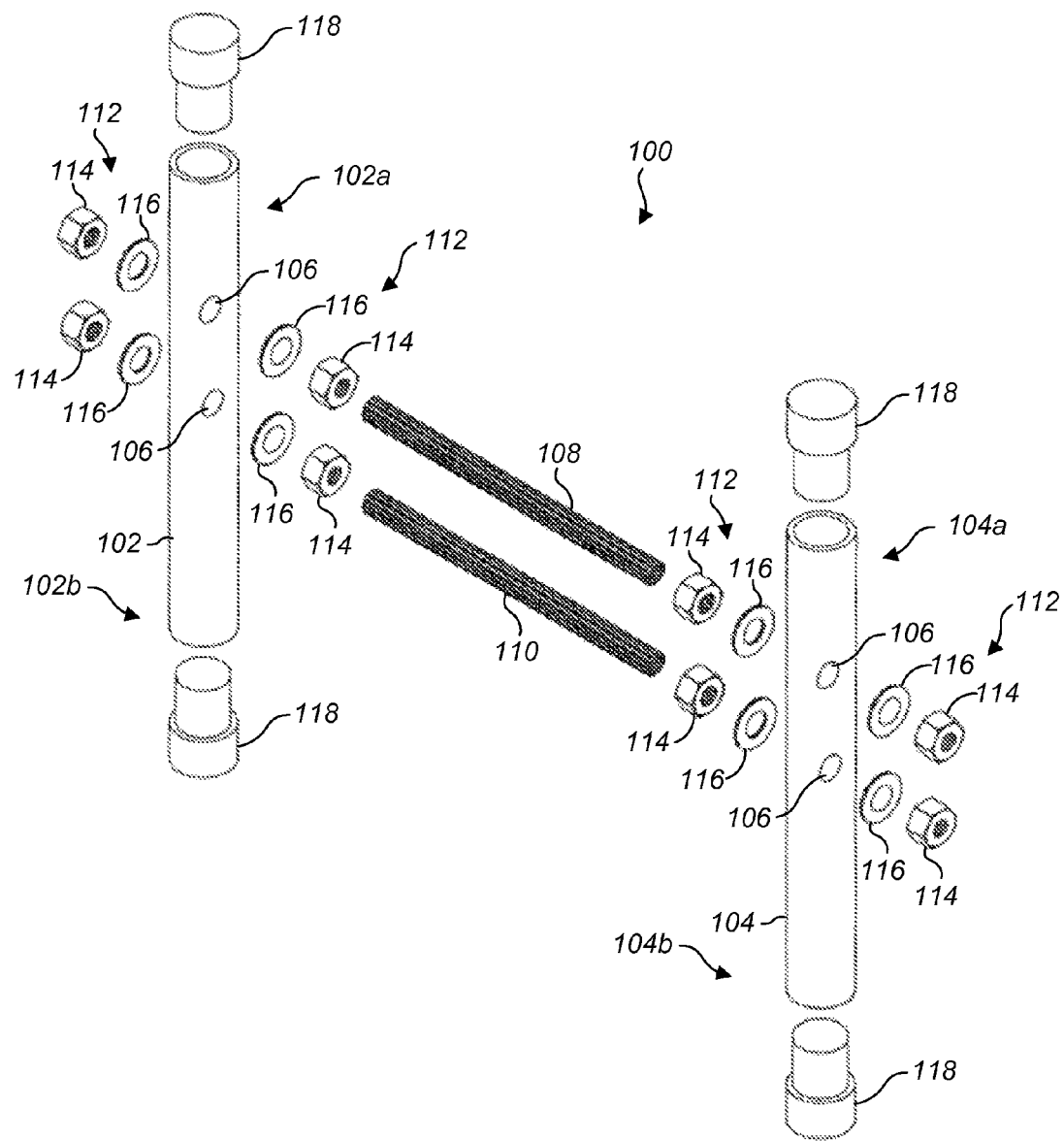
FIG. 1 shows an exploded view of a stabilizing device for an outboard motor.
Figure 2:
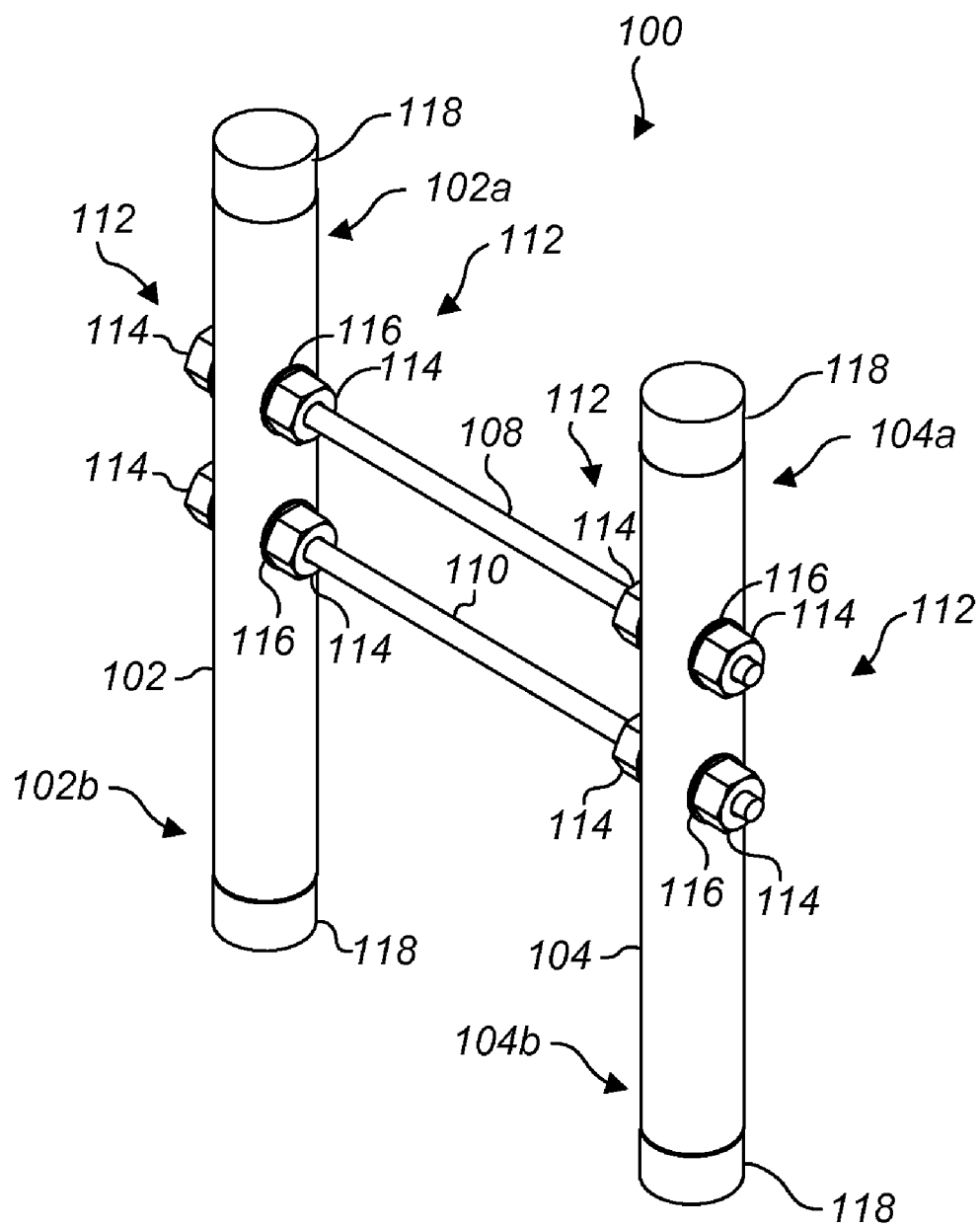
FIG. 2 shows a perspective view of the stabilizing device shown in FIG. 1.

Referring to FIGS. 1 and 2, a stabilizing device 100 is illustrated. FIG. 1 shows an exploded view of the stabilizing device 100, and FIG. 2 shows a perspective view of the assembled stabilizing device 100. The stabilizing device 100 comprises a first support shaft 102 having an upper end 102*a* and a lower end 102*b* and a second support shaft 104 having an upper end 104*a* and a lower end 104*b*. At least two holes 106 extend through each of the first and second support shafts 102 and 104. A first connecting rod 108 and a second connecting rod 110 extend between the first and second support shafts 102 and 104 and through respective holes 106 in each of the first and second support shafts 102 and 104.

Attachment hardware 112 is used to removably secure the first and second connecting rods 108 and 110 to the first and second support shafts 102 and 104. Attachment hardware 112 is also used to adjust the first and second connecting rods 108 and 110 relative to the first and second support shafts 102 and 104 as discussed below in connection with FIGS. 3A-3C. In the illustrated embodiment, the first and second connecting rods 108 and 110 are at least partially threaded, and the attachment hardware 112 includes nuts 114 and washers 116. However, alternative attachment means can be used as attachment hardware 112 in place of the nuts 114 and washers 116, such as, for example, slide-on clips and/or band clamps. The nuts 114 and washers 116 can be formed of a variety of different materials. For example, nuts 114 and washers 116 can be formed of plastic, metal, or other suitable rigid material.

The first and second support shafts 102 and 104 can comprise respective hollow tubes as shown in FIG. 1. Alternatively, solid or partially-filled tubes can be used for one or both of the support shafts 102 and 104. The support shafts 102 and 104 are open to the top and bottom, and bumpers 118 are attached to each open end of the support shafts 102 and 104. In the embodiment shown in FIG. 1, the bumpers 118 are slidably attached and frictionally held in place. However, in alternative embodiments, the bumpers 118 can be attached using alternative attachment methods or can be integrally formed with the support shafts 102 and 104. For example, in alternative embodiments, the bumpers 118 can be threaded into the support shafts 102 and 104 and/or the bumpers can be more permanently attached to the support shafts using an adhesive. The bumpers 118 can be formed of a variety of different materials. For example, bumpers 118 can be formed of plastic, rubber, or other semi-rigid or resilient material.

The first and second support shafts 102 and 104 can be formed of a variety of different materials. For example, the first and second support shafts 102 and 104 can be formed of plastic, metal, or other rigid material. More specific examples of suitable materials include polyvinyl chloride (PVC) and aluminum.

The first and second connecting rods 108 and 110 can be formed of a variety of different materials. For example, the first and second connecting rods 108 and 110 can be formed of plastic, metal, or other rigid or semi-rigid material. In some embodiments, the entire length of one or both of the first and second connecting rods 108 and 110 can be threaded. In other embodiments, only one or more portions of one or both of the first and second connecting rods 108 and 110 can be threaded. For example, in some embodiments, the first and second connecting rods 108 and 110 can include threaded end regions and a smooth, non-threaded central region. In still further embodiments, the first and second connecting rods 108 and 110 can be entirely non-threaded, particularly in embodiments where the type of attachment hardware being used does not require threading, such as, for example, where band clamps are used as attachment hardware 112. In some embodiments, the first and second connecting rods 108 and 110 are formed of a semi-rigid material such as plastic that allows the first and second connecting rods 108 and 110 to flex as described below in connection with FIGS. 3A-3C. In some embodiments, the first and second connecting rods 108 and 110 can be entirely solid. In alternative embodiments, first and second connecting rods 108 and 110 can be hollow or partially hollow.

Figure 3A:
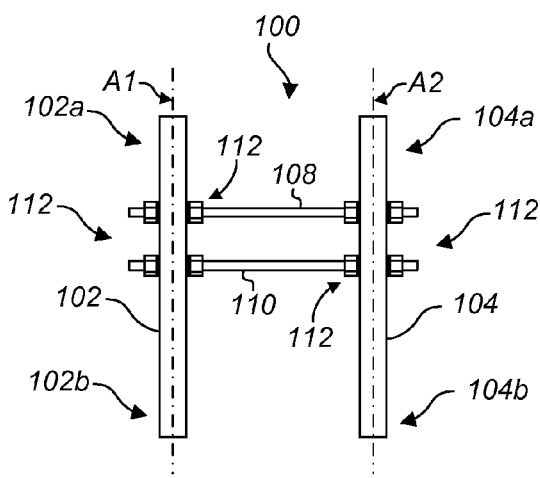
FIGS. 3A-3C show front views of the stabilizing device shown in FIGS. 1 and 2 in various adjustment configurations.
Figure 3B:
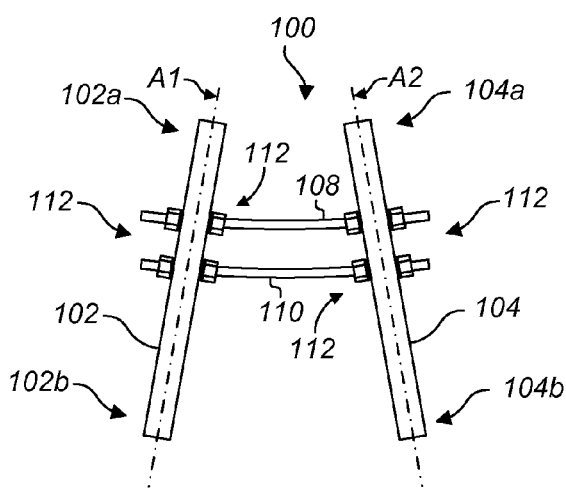
Figure 3C:
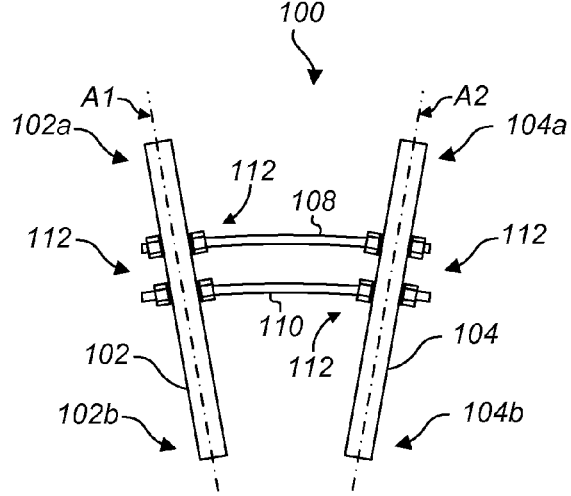

Turning next to FIGS. 3A-3C, the stabilizing device 100 is adjustable in order to allow it to be installed on a wide variety of different outboard motors and steering systems. FIGS. 3A-3C illustrate examples of configurations to which the stabilizing device 100 can be adjusted and locked. The first support shaft 102 extends in a first longitudinal direction along a first longitudinal axis A1, and the second support shaft 104 extends in a second longitudinal direction along a second longitudinal axis A2. As shown in FIG. 3A, the first and second support shafts 102 and 104 can be adjusted such that the first and second longitudinal axes A1 and A2 are parallel. As shown in FIG. 3B, the first and second support shafts 102 and 104 can be adjusted such that upper ends 102a and 104a of first and second support shafts 102 and 104 are closer than the lower ends 102b and 104b. As shown in FIG. 3C, the first and second support shafts 102 and 104 can be adjusted such that upper ends 102a and 104a of first and second support shafts 102 and 104 are farther apart than the lower ends 102b and 104b.

Thus, the angle between the first and second longitudinal axes A1 and A2 can be adjusted as the stabilizing device 100 is adjusted to, and between, the positions shown in FIGS. 3A-3C. Preferably the first and second connecting rods 108 and 110 are formed of a semi-rigid material, such as plastic, that allows the first and second connecting rods 108 and 110 to become slightly bowed as the angle between the first and second longitudinal axes A1 and A2 increases.

In addition to the configurations shown in FIGS. 3A-3C, the stabilizing device 100 is continuously adjustable to numerous other positions, for example where the angle between the first and second longitudinal axes A1 and A2 is between those shown in FIGS. 3B and 3C and/or where the distance between the first and second support shafts 102 and 104 is less than or greater than shown. The stabilizing device 100 can be adjusted to and/or between the configurations shown in FIGS. 3A-3C by loosening the attachment hardware 112 (or otherwise unsecuring attachment hardware 112, depending on the type of attachment hardware 112 in use), adjusting the first and second support shafts 102 and 104 to the desired relative positions, and then tightening or otherwise securing the attachment hardware 112. Note that in this embodiment, the holes 106 are large enough to allow the first and second connecting rods 108 and 110 to slide freely therethrough when the attachment hardware 112 is loosened or otherwise unsecured. In alternative embodiments, the holes 106 can be at least partially internally threaded.

Figure 4A:
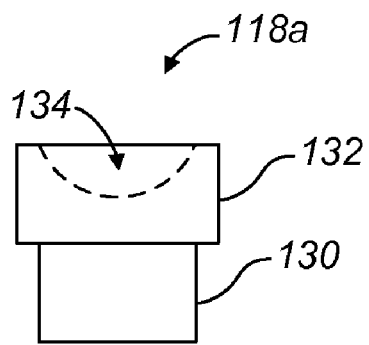
FIGS. 4A and 4B show a side view of respective embodiments of bumpers for the stabilizing device shown in FIGS. 1 and 2.
Figure 4B:
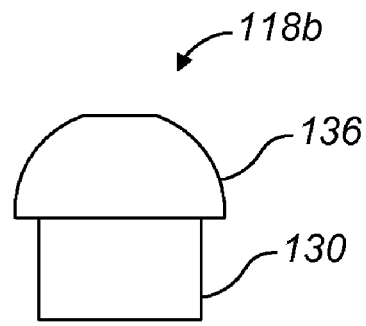

Turning next to FIGS. 4A and 4B, embodiments of bumpers 118 are shown. FIG. 4A shows a first embodiment as bumper 118a, and FIG. 4B shows a second embodiment as bumper 118b. Both embodiments include a base 130 that is sized and shaped so as to snugly fit within an open end of the first and second support shafts 102 and 104. In alternative embodiments, the base 130 can be threaded or otherwise adapted to be attached to an end of one of the first and second support shafts 102 and 104. The bumper 118a has an upper portion 132 that has a recessed portion 134. The recessed portion is shaped like an inverted dome; however, other shapes can be used. The bumper 118b has an upper portion 136 is formed in the shape of a dome. Still further embodiments of the bumper 118 can have upper portions of other shapes.

Figure 5B:
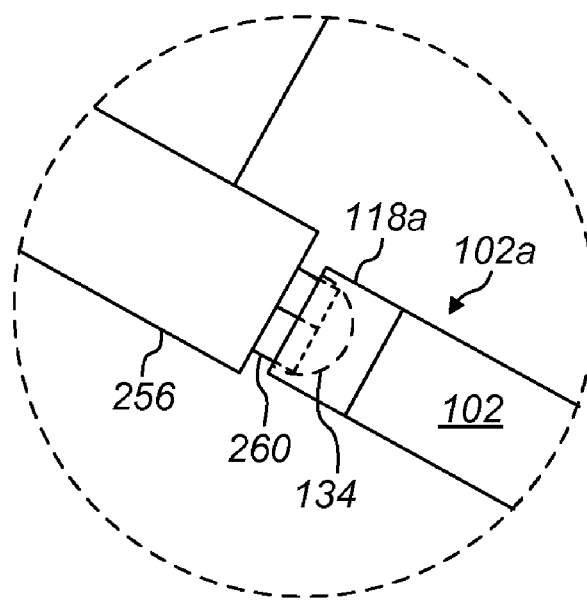
FIG. 5B shows an enlarged view of a designated portion of FIG. 5A.
Figure 5A:
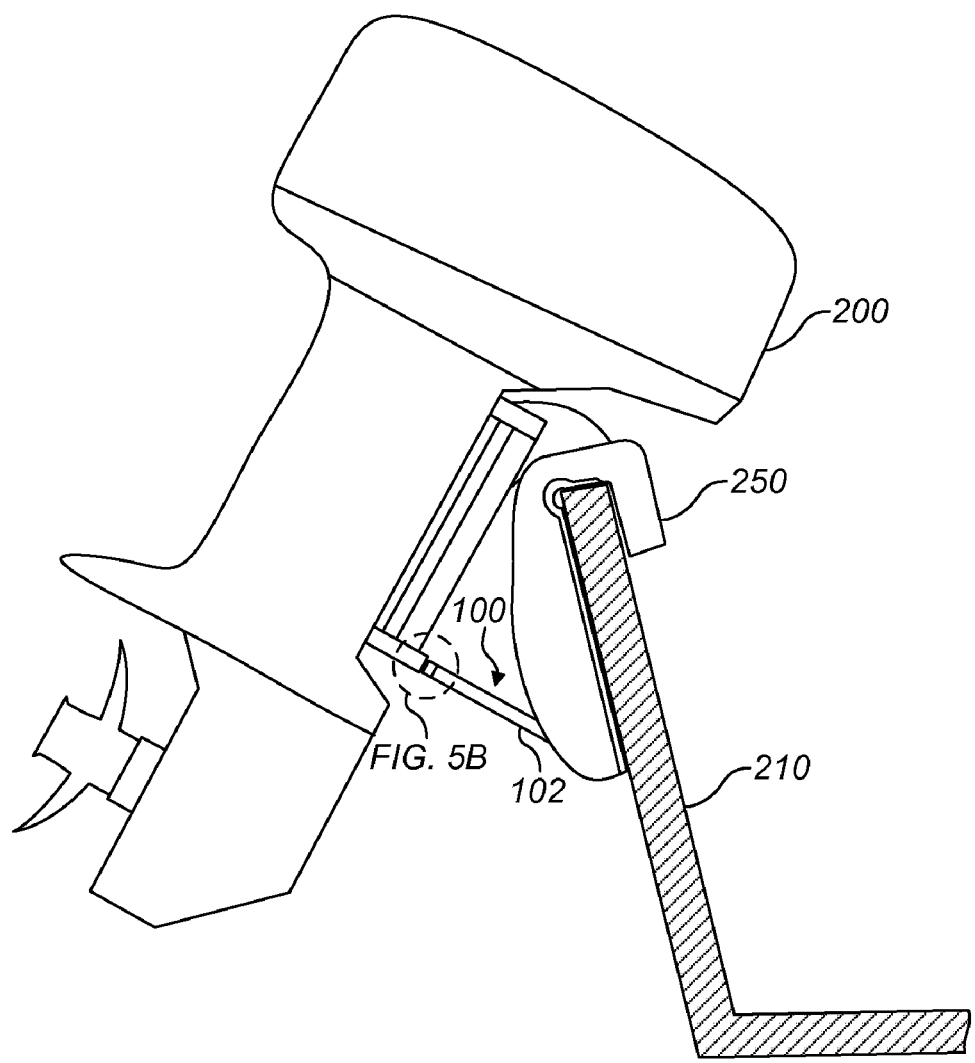
FIG. 5A shows a side view of the stabilizing device shown in FIGS. 1-4 installed for stabilizing an outboard motor.
Figure 6:
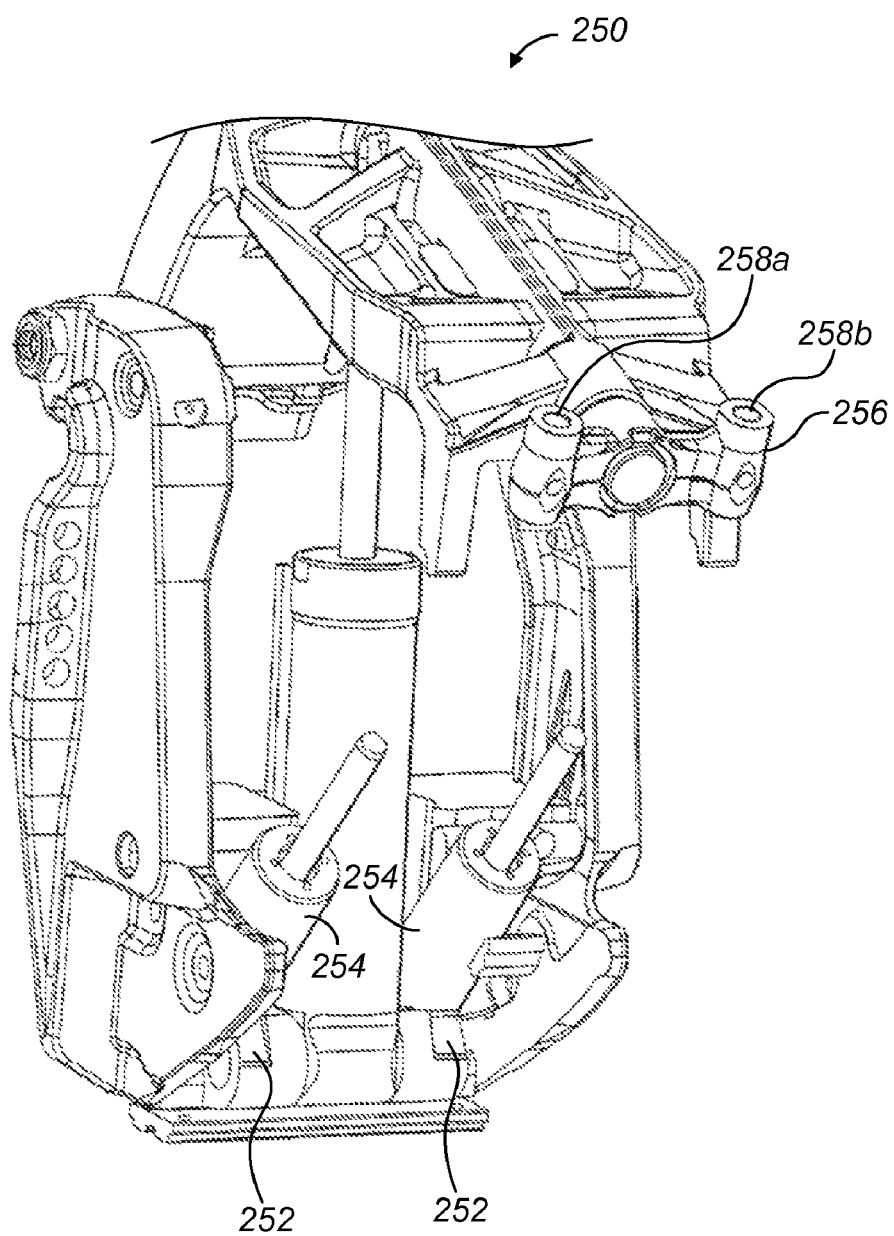
FIG. 6 shows an example of a trim and tilt system for an outboard motor.

Turning next to FIGS. 5A, 5B, and 6, the stabilizing device 100 is particularly useful for stabilizing an outboard motor 200, for example while trailering a boat. FIG. 5A shows the stabilizing device 100 installed for stabilizing outboard motor 200, and FIG. 6 shows an example of a trim and tilt system 250 for outboard motor 200. FIG. 5B shows an enlarged view of the designated portion of FIG. 5A. The stabilizing device 100 is adjustable for use with a variety of outboard motors and steering systems; thus, the outboard motor 200 and steering system 250 are shown merely as examples. Examples of steering systems are disclosed in U.S. Pat. No. 6,325,686 to Funami, U.S. Pat. No. 5,178,168 to Binversie et al., U.S. Pat. No. 4,391,592 to Hundertmark, and U.S. Pat. No. 6,227,920 to Alby et al. In a manner generally known to those skilled in the art, the steering system 250 is attached to a transom 210 of a marine vessel.

The stabilizing device 100 positively locks the steering system 250 and secures the motor 200 in travel position as shown in FIG. 5A. As shown in FIG. 6, a typical steering system such as steering system 250 includes recesses such as recesses 252 near the base of trim cylinders 254. The recesses 252 serve as lower mounting locations for lower ends 102b and 104b of the first and second support shafts 102 and 104. The steering system 250 also includes a lower yoke assembly 256. First and second mounting holes 258a and 258b extend through the lower yoke assembly 256. In a manner generally known to those skilled in the art, outboard motor 200 is rigidly attached to the steering system 250 by passing the engine bolts of the outboard motor 200 through holes 258a and 258b and attaching nuts 260 to the opposite side in order to secure the outboard motor 200 in place. The nuts 260 attached to these two engine bolts serve as upper mounting locations for upper ends 102a and 104a of the first and second support shafts 102 and 104. Thus, the stabilizer device 100 can be frictionally held in place, so no attachment hardware is necessary for installing the stabilizing device 100.

It will be appreciated that the bumpers 118a are particularly useful for the upper ends 102a and 104a of the first and second support shafts 102 and 104, as the recessed portion 134 can fit over the nuts 260 at the upper mounting locations as best shown in FIG. 5B. It will also be appreciated that the bumpers 118b are particularly useful for the lower ends 102b and 104b of the first and second support shafts 102 and 104, as the dome-shaped upper portion 136 can be fit into the recessed portions 252 at the lower mounting locations.

It will also be appreciated that the distance between the recesses 252 can vary and the distance between the holes 258a and 258b and respective nuts 260 can vary, for example, depending on the make and model of the particular steering system 250 and/or outboard motor 200. The stabilizing device 100 can advantageously be adjusted as shown and described above in connection with FIGS. 3A-3C in order to accommodate such differences.

In order to install the stabilizing device 100, a user can first measure the distance between the centers of the engine bolts/ nuts 260 and measure the distance between the centers of the recesses 252. The user then loosens or otherwise unsecures the attachment hardware 112, adjusts the distance between the upper ends 102a and 104a to match the distance between the engine bolts/nuts 260, adjusts the distance between the lower ends 102b and 104b to match the distance between the recesses 252, and then tightens or otherwise secures the hardware 112. The user then turns the outboard motor 200 until it is straight and in position for transport and raises the outboard motor 200 if necessary to allow room for the stabilizing device 100 to be placed between the engine bolts/nuts 260 and the recesses 252. The user then holds the stabilizing device 100 in position with the bumpers 118 of the upper ends 102a and 104a placed over the engine bolts/nuts 260 and, while slowly lowering the outboard motor 200 with the tilt and trim, guides the lower ends 102b and 104b of the support shafts 102 and 104 into recesses 252. When the stabilizer device 100 is in position, the user can slowly lower the outboard motor 200 until the hydraulic system of the steering system 250 starts to load and then stop lowering. The user can then adjust the steering slightly in both directions until the outboard motor 200 is completely centered then lower the outboard motor 200 until the hydraulic system bottoms out. After the outboard motor 200 is completely loaded onto the stabilizer device 100, the user can again adjust the steering in both directions until the outboard motor 200 is completely centered and locked into position.

It is apparent that an invention with significant advantages has been described and illustrated. Although the present application is shown in a limited number of forms, it is not limited to just these forms, but is amenable to various changes and modifications without departing from the spirit thereof.

What is claimed is:

1. An outboard motor and steering system motions stabilizing device comprising:
a first support shaft extending in a first longitudinal direction, the first support having a first lower end that is configured to securely reside against a first recess of a steering system for the outboard motor, the first support also having a first upper end that is configured to securely reside against a first portion of a lower yoke assembly of the outboard motor;
a second support shaft extending in a second longitudinal direction, the second support having a second lower end that is configured to securely reside against a second recess of the steering system for the outboard motor, the second support also having a second upper end that is configured to securely reside against a second portion of the lower yoke assembly of the outboard motor;
a first connecting rod adjustably connected to the first and second support shafts at locations spaced away from the first lower end and the first upper end of the first support, wherein a first end of the first connecting rod is attached to the first support shaft and a second end of the first connecting rod is attached to the second support shaft; and
a second connecting rod adjustably connected to the first and second support shafts at locations spaced away from the second lower end and the second upper end of the second support, wherein a first end of the second connecting rod is attached to the first support shaft and a second end of the first connecting rod is attached to the second support shaft,
wherein an angle between the first and second longitudinal directions can be adjusted by adjusting one or more of the adjustable connections between the first and second support shafts and the first and second connecting rods.

2. The device of claim 1, wherein at least one of the first and second connecting rods comprises a threaded rod.

3. The device of claim 2, wherein the threaded rod extends through the first support shaft.

4. The device of claim 3, further comprising a first threaded nut and a second threaded nut, the first and second threaded nuts being disposed on opposing sides of the first support shaft.

5. The device of claim 1, wherein at least one of the first and second support shafts comprises a hollow tube.

6. The device of claim 5, wherein the hollow tube consists essentially of plastic.

7. The device of claim 5, wherein the hollow tube consists essentially of metal.

8. The device of claim 1, further comprising a bumper attached to each of the first lower end and the second lower end, the bumper being an axial extension of the first support shaft and the second support shaft.

9. The device of claim 1, further comprising a bumper attached to each of the first upper end and the second upper end, the bumper being an axial extension of the first support shaft and the second support shaft.

10. The device of claim 8, wherein the bumper comprises a dome-shaped end.

11. The device of claim 9, wherein the bumper comprises an inverted dome-shaped end.

12. An outboard motor and steering system motions stabilizing device comprising:
a first support means extending in a first longitudinal direction, the first support means having a first lower end that is configured to securely reside against a first recess of a steering system for the outboard motor, the first support means also having a first upper end that is configured to securely reside against a first portion of a lower yoke assembly of the outboard motor;
a second support means extending in a second longitudinal direction, the second support means having a second lower end that is configured to securely reside against a second recess of the steering system for the outboard motor, the second support means also having a second upper end that is configured to securely reside against a second portion of the lower yoke assembly of the outboard motor;
a first connecting means adjustably connected to the first and second support means at locations spaced away from the first lower end and the first upper end of the first support means, wherein a first portion of the first connecting means is attached to the first support shaft and a second portion of the first connecting means is attached to the second support means; and
a second connecting means adjustably connected to the first and second support means at locations spaced away from the second lower end and the second upper end of the second support means, wherein a first portion of the second connecting means is attached to the first support means and a second end of the first connecting means is attached to the second support means,
wherein an angle between the first and second longitudinal directions can be adjusted by adjusting one or more of the adjustable connections between the first and second support shafts and the first and second connecting rods.

13. The device of claim 12, wherein at least one of the first and second connecting means comprises a threaded rod.

14. The device of claim 13, wherein the threaded rod extends through the first support means.

15. The device of claim 14, further comprising a first threaded nut and a second threaded nut, the first and second threaded nuts being disposed on opposing sides of the first support means.

16. The device of claim 12, wherein at least one of the first and second support means comprises a hollow tube.

17. The device of claim 16, wherein the hollow tube consists essentially of plastic.

18. The device of claim 16, wherein the hollow tube consists essentially of metal.

19. The device of claim 12, further comprising a bumper attached to each of the first lower end and the second lower end, the bumper being an axial extension of the first support means and the second support means, each bumper having dome-shaped end configured to mate with the first and second recesses of the steering system.

20. The device of claim 12, further comprising a bumper attached to each of the first upper end and the second upper end, the bumper being an axial extension of the first support means and the second support means, each bumper having a recessed portion configured to receive the first and second portions of the lower yoke assembly.

* * * * *